United States Patent [19]

Curtis

[11] Patent Number: 4,710,082

[45] Date of Patent: Dec. 1, 1987

[54] SEALED AND SECURED FASTENER

[76] Inventor: Gerald J. Curtis, 8806 Glen Loch Dr., Houston, Tex. 77017

[21] Appl. No.: 876,375

[22] Filed: Jun. 18, 1986

[51] Int. Cl.[4] .......................................... F16B 41/00
[52] U.S. Cl. .................................... 411/373; 70/232; 285/89; 411/429; 411/542; 411/910
[58] Field of Search ............... 411/303, 304, 371, 372, 411/373, 374, 335, 376, 377, 429, 431, 369, 910, 542; 70/229, 230, 231, 232; 285/89

[56] References Cited

U.S. PATENT DOCUMENTS

| 508,402 | 11/1893 | Brown | 411/305 X |
|---|---|---|---|
| 1,625,901 | 4/1927 | Lay | 70/231 X |
| 1,705,590 | 3/1929 | Simpson | 70/231 X |
| 1,900,146 | 3/1933 | Winkler | 70/231 X |
| 1,925,937 | 9/1933 | Schultis | 285/89 |
| 2,316,695 | 4/1943 | Jaffa | 70/232 X |
| 2,960,353 | 11/1960 | Woodling | 285/89 |
| 3,789,635 | 2/1974 | Brunt et al. | 70/232 |
| 4,336,698 | 6/1982 | Hurd | 70/231 |
| 4,406,140 | 9/1973 | Wolter | 70/231 |
| 4,436,468 | 3/1984 | Ozaki et al. | 411/304 |

FOREIGN PATENT DOCUMENTS

| 1050037 | 2/1959 | Fed. Rep. of Germany | 411/373 |
|---|---|---|---|
| 2828783 | 7/1979 | Fed. Rep. of Germany | 70/232 |
| 1502520 | 10/1967 | France | 411/373 |

Primary Examiner—Lloyd A. Gall
Attorney, Agent, or Firm—Ned L. Conley; David A. Rose; Kurt S. Myers

[57] ABSTRACT

The invention relates to a sealed housing for a bolt, including a nut body in threaded engagement with the bolt, and a housing which encloses the nut body. A lock cylinder locks the housing to an anchoring shoulder in the nut body. An elastomeric O-ring is disposed between a circumferential groove in the nut body and a gland bore in the housing.

10 Claims, 7 Drawing Figures

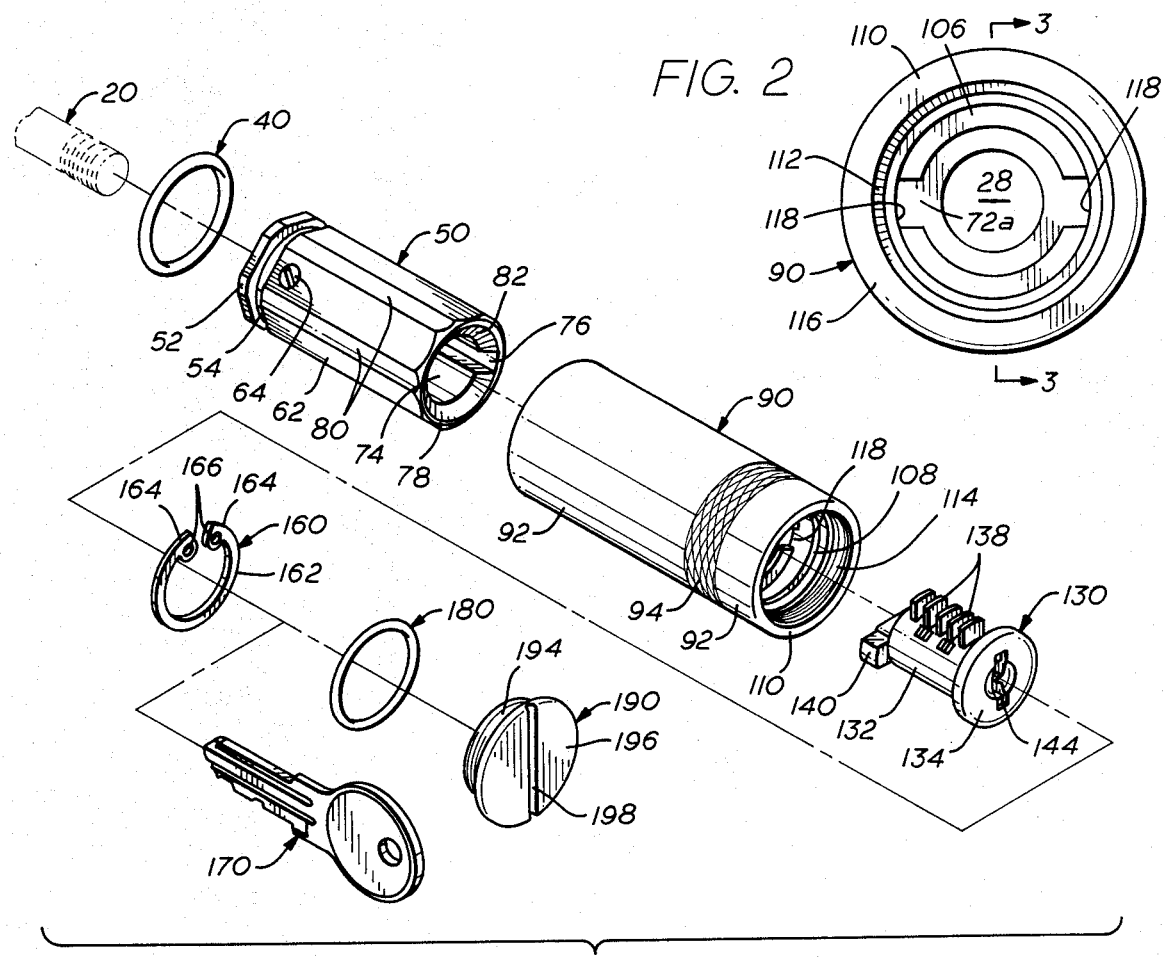
FIG. 2
FIG. 1
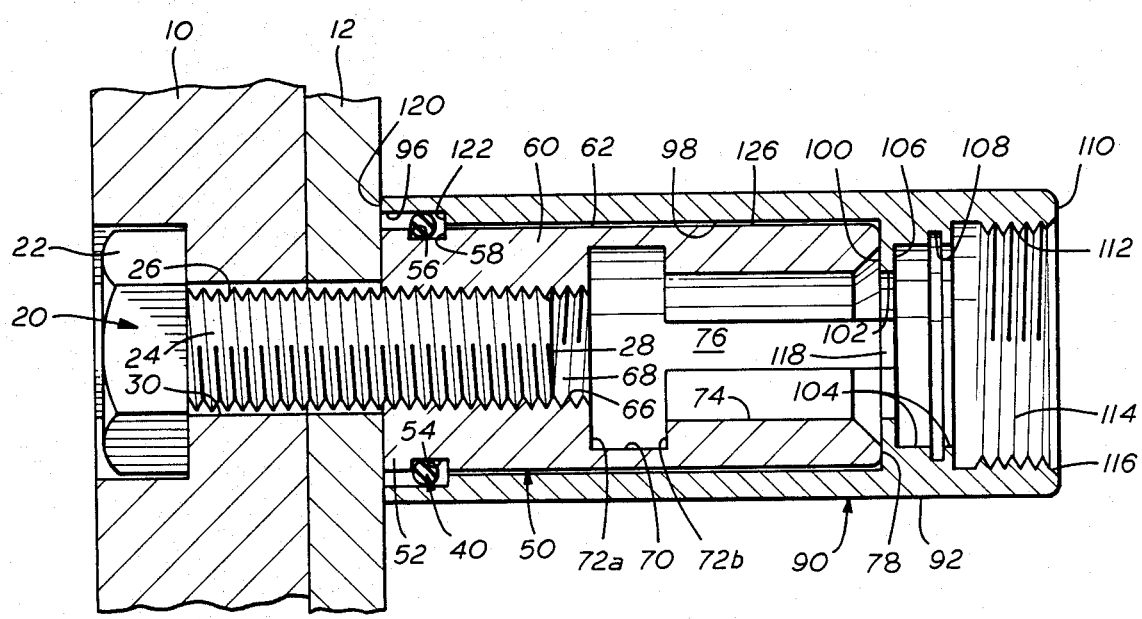
FIG. 3

SEALED AND SECURED FASTENER

BACKGROUND OF THE INVENTION

The present invention relates generally to the field of fastening devices, and more particularly to secured fastening devices. Still more particularly, it relates to secured fastening devices sealed against environmental corrosion and degradation.

Many machines or devices often are assembled from elements that must be fastened together to be operable. Such fastening sometimes must be other than permanent and capable of subsequent disassembly to allow for maintenance, repair, and replacement of worn or broken components. In such instances, some modes of fastening (e.g., welding or gluing) are undesirable since they form a permanent bond. One preferred fastening method that permits subsequent disassembly is to use a threaded fastener, such as a bolt or a stud, joined with a matching threaded nut. A rigid connection thus can be achieved, to be dismantled later as necessary.

Employing removable fasteners to permit subsequent dismantling of an assembly, however, creates a security problem. Frequently, whatever is fastened together is of value and, hence, attractive to thieves and vandals. If any valuable element of the assembly is readily removable and transportable, the danger of theft and loss becomes more acute. In particular, items which often remain outdoors and/or within accessible but unsecured areas are those most likely to be subject to vandalism and theft. A variety of commonly-owned articles fall in such a category of loss-prone items. Outboard motors fastened to boats, motorcycle parts, furniture, lighting fixtures, statuary, and the like, all are examples of items that might be fastened in place and are probable candidates for theft.

One solution to the hazard of theft has been to provide secured, lockable fastening means. Prior art devices exist that allow locking or otherwise securing a fastener to prevent unauthorized removal of that fastener. One prior art apparatus, for example, has found application in securing propellers to motorboat engines. This apparatus includes an elongated nut attached to a threaded bolt to secure the propeller to the motor shaft. A cotter pin penetrates the nut and the bolt to prevent accidental rotation of the bolt and resultant loss of the propeller. A set screw in the body of the nut further impedes unintended rotation of the nut. A lockable, sleeve-like metal housing slides over the assemblage after the nut, set screw, and cotter pin are installed. When the housing seats and is locked in place, it partly covers the nut, blocking access to and thereby preventing removal of the cotter pin. The housing remains free to rotate around the nut, even while locked to the nut. The housing thus deters a would-be thief in three ways. First, it prevents removal of the cotter pin, thereby preventing rotation of the nut. Secondly, it protects and shields the set screw that holds the nut in place. Lastly, it precludes application of torque to the body of the nut; rotating the housing will not rotate or affect the position of the nut.

Prior art devices are known, then, for securing a nut and bolt assembly, or other fastener, against unauthorized casual—or even determined—removal. Certain environments and extended use or exposure, however, can drastically reduce the widespread applicability of such devices. Corrosion is always a problem with removable fasteners such as threaded nuts and bolts. Corrosion of the threads can make removal of the nut difficult or impossible. Corrosion, moreover, can render a lock housing, a lock cylinder, and other intricate moving parts inoperative and useless. Corrosion of locking mechanisms securing fasteners thus only worsens the effects of the environment, obstructing or precluding disassembly of fastened components when such disassembly is required. More severe operating environments hasten and magnify the severity of corrosion and environmental degradation.

It can be seen, then, that a need exists for fasteners that can be secured against unauthorized breakage and tampering. Devices are existent in the prior art that accomplish the limited objective of maintaining security for fasteners. The prior art devices, however, suffer from vulnerability to corrosion and environmental exposure, a vulnerability that reduces the net value and shortens the operating life of such prior art devices. A continued need exists for fasteners that are not only secured, but can be protected against the elements to enhance and extend the economic advantage and the life of such secured fasteners.

SUMMARY OF THE INVENTION

The present invention allows assembly of a sealed, secured fastener. The present invention provides a housing movably secured to and enclosing enough of a fastener to prevent unauthorized removal thereof. The present invention further provides means for sealing the fastener inside the housing.

In the case of a nut and bolt assembly, the nut mates with the bolt, and a housing substantially surrounds the nut and some space around the nut. The housing surrounds the nut sufficiently to prevent direct application of torque to the nut. A lock cylinder within the housing secures the housing to the nut, but allows the housing to rotate without transferring sufficient torque to rotate the nut. The housing is further sealed at both open ends of the housing to exclude environmental attack and exposure. An elastomeric first O-ring provides a seal between the nut and the housing at one end, nearest the bolt head. A groove in the nut and a bore in the housing align to form a seal gland for the first O-ring. The O-ring thus seals between the nut and the housing, preventing passage of water and air therebetween. After installation and locking of the housing, a cap is threaded and tightened into an opening in the other end of the housing. An elastomeric second O-ring, disposed around the cap body below the head of the cap, provides a seal between the housing and the cap when the cap is tightened and seated. This second O-ring, in conjunction with the cap, thus seals the second housing opening, preventing entry of environmental fluids and contaminants into the housing interior containing the nut and the lock cylinder.

The assembled fastener is thus secured, with the threads and locking mechanism sealed off from the environment. This sealed, secured fastener can be exposed to and will endure much harsher conditions than prior art devices. The sealed, secured fastener thus is longer-lived and, hence, more economical than prior art secured fasteners. These and various other objects and advantages of the present invention will become readily apparent to those skilled in the art upon reading the following detailed description and claims and by referring to the accompanying drawings.

BRIEF DESCRIPTION OF THE DRAWINGS

For a detailed description of the preferred embodiment of the present invention, reference will now be made to the accompanying drawings wherein:

FIG. 1 illustrates an exploded perspective view of a sealed, secured fastener made according to the present invention;

FIG. 2 illustrates an end-on elevational view of the fastener of FIG. 1, viewed along the axis of the fastener when partially assembled, before installation of the lock cylinder;

FIG. 3 illustrates an elevational sectional view of the fastener of FIG. 2, viewed along lines 3—3 of FIG. 2;

DESCRIPTION OF THE PREFERRED EMBODIMENT

Figure 4:
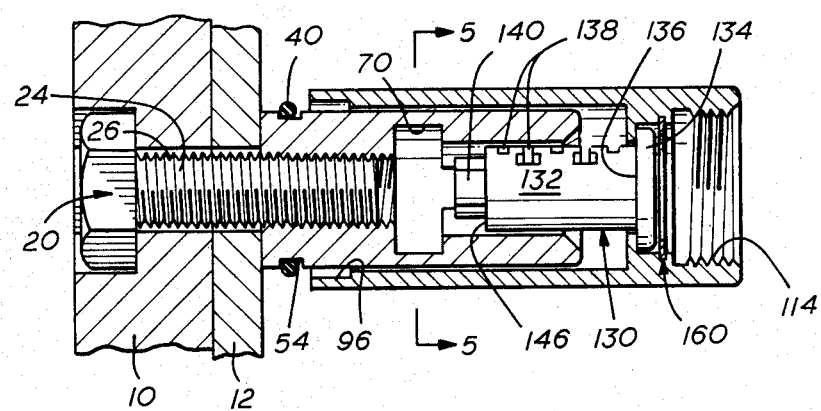
FIG. 4 illustrates an elevational sectional view of the fastener of FIG. 1, in the process of installation.

Referring initially to FIG. 1, the constituent elements of the fastener are shown therein in exploded perspective view. These elements can be combined in assembly as depicted by the dashed line shown in FIG. 1. The fastener comprises several major components for securing a bolt 20, including a nut 50, a first O-ring 40 mounted around the nut 50 near one end thereof, a housing 90, a lock cylinder 130 held in housing 90 by a snap ring 160, a key 170 for actuation of the lock cylinder 130, and a cap 190 to be installed with a second O-ring 180 onto the housing 90 after removal of the key 170. All of these elements can be manufactured from a variety of materials, as appropriate for the application and the environment. For greatest protection, the major securing elements should be made from high-strength, relatively inelastic material, such as steel, cast iron, brass, aluminum, alloy metals, or perhaps composite plastics. These major securing elements include the bolt 20, the nut 50, the housing 90, and most of the lock cylinder 130. The first and second O-rings 40, 180 may be made of resilient elastomeric material as commonly used for sealing, such as natural rubber or a variety of synthetic rubbers, including butyl, nitrile, and polyurethane rubbers, depending on the specific application. The snap ring 160 must be rigid yet elastic; a high-strength steel is preferred for the snap ring 160.

FIG. 2 illustrates a view along the axis of the fastener of FIG. 1. Specifically, FIG. 2 illustrates the housing 90 as seen in an end-on view of the housing base 110, with the nut 50 and the bolt 20 installed in the housing 90 through the opening on the other end of the housing 90.

With reference to FIG. 3, the fastener of the present invention is shown therein, absent each of the lock cylinder 130, snap ring 160, key 170, O-ring 180, and cap 190, all removed for clarity. The fastener as shown in FIG. 3 secures an object to a base surface, such as a mounting plate 12 of an outboard engine might be mounted onto the base or transom 10 of a boat. The bolt 20 is concentrically aligned with a bolt hole 30 running through the transom 10 and a mounting plate 12. The bolt 20, having a bolt head 22 joined to the end of a bolt shaft 24, penetrates the bolt hole 30, with the bolt head 22 seated securely inside a recess in the transom 10. Threads 26 on the peirphery of the bolt shaft 24 terminate at a bolt base 28 disposed on the end of the bolt shaft 24 extending beyond the mounting plate 12.

With reference to FIG. 1 and FIG. 3, the nut 50 has a nut body 60 with a nut head 52 at one end and a nut base 78 at the other end. The nut body 60 has an exterior surface 62 generally hexagonal in shape, but having flat, beveled surfaces 80 at each vertex where the sides meet. Of course, any exterior surface 62 suitable to the purposes of the invention would be adequate, for example, a smooth, cylindrical surface having parallel flattened surfaces on opposite sides for engagement by a wrench would be acceptable. The shape of the exterior surface 62 thus facilitates tightening of the nut 50 onto the bolt 20 by means of a wrench or other suitable device. A set screw 64 is threaded into and penetrates a matching threaded hole in the wall of the nut body 60. The set screw 64 is made of a deformable yet rigid material, such as plastic. The cylindrical axis of the set screw 64 is perpendicular to the cylindrical axis of the nut 50; tightening the set screw 64 thus drives the set screw 64 toward the cylindrical axis of the nut 50. After the nut 50 is tightened onto the bolt 20, the set screw 64 is tightened down onto the bolt shaft 24. The forward end of the set screw 64, made of deformable material, tends to mesh into and conform with the bolt threads 26. The force imposed by the set screw 64 against the bolt shaft 24 and the meshing of the set screw 64 with the bolt threads 26 combine to help hold the nut 50 in place, tightened onto the bolt 20. For normal, authorized removal, the set screw 64 can first be backed off to permit loosening of the nut 50. If the set screw 64 remains in a tightened position, intentional or accidental removal of the nut 50 by unthreading or by vibration is extremely difficult, or impossible. The set screw 64 especially helps prevent unauthorized loosening of the fastener by turning of the bolt head 22 after the nut 50 and the housing 90 are installed, as described below.

A circumferential groove 54 is cut into the nut body 60 adjacent to the nut head 52. The first O-ring 40 is sized to fit snugly around the circumferential groove 54, the inner diameter of the first O-ring 40 being slightly less than the outer diameter of the circumferential groove 54, so that the first O-ring 40 is in sealing engagement with the circumferential groove 54 upon assembly. Proper sizing and configuration of the first O-ring 40 can be done in accordance with techniques well known in the art of sealing, and need not be discussed further herein. Reference can be made to conventional methods of design and construction to provide a first O-ring 40 that will effect a sealing engagement with the outer diameter surface of the circumferential groove 54. Once the first O-ring 40 is installed around and within the circumferential groove 54, it is laterally restrained from excess displacement by a first groove wall 56 and a second groove wall 58.

The nut 50 is shown in FIG. 3 threaded and substantially fully tightened onto the bolt 20. A straight threaded bore 66 is concentrically aligned with the bolt shaft 24. The bolt threads 26 on the periphery of the bolt shaft 24 matingly engage bolt receiving threads 68 disposed on the interior of the nut 50. The bolt receiving threads 68 spiral along the interior surface of the threaded bore 66 from an opening through the nut head 52 to an anchoring bore 70 inside the nut body 60. A first anchor bore wall 72a is formed where the threaded bore 66 meets the anchoring bore 70. At the opposite end of the anchoring bore 70 is a flat anchoring shoulder 72b formed by the conjunction of the anchoring bore 70 and a smaller-diameter cylinder receiving bore 74. The cylinder receiving bore 74 in turn leads to the exterior of the nut 50 through a nut base 78, disposed at the end of the nut 50 opposite the nut head 52, as also shown in FIG. 1. An inwardly sloping entry shoulder 82, radially disposed inside the nut base 78, connects the cylinder receiving base 74 with the nut base 78. Still with reference to FIG. 1 and FIG. 3, a pair of longitudinal grooves 76 are cut into the interior wall of the nut body 60 within the cylinder receiving bore 74, and extend from the anchoring bore 70, through the entry shoulder 82, to the nut base 78. The anchoring bore 70 might be described as providing the separation between a securing end and a locking end of the nut. The securing end includes the nut head 52 and the bolt receiving threads 68. The locking end includes the anchoring shoulder 72b and the longitudinal grooves 76.

The housing 90 is generally cylindrical in shape, having a series of bores therethrough extending from the housing head 120 to the housing base 110. The housing 90 has a smooth exterior surface 92 interrupted by a knurled surface 94 comprising a banded region encircling the circumference of the housing 90, and located in proximity to the housing base 110. The knurled surface 94 aids in manually manipulating the housing 90. The illustration in FIG. 3 shows the housing 90 installed over the nut 50. A gland bore 96 extends from the housing head 120 to a nut receiving bore 98 that is smaller in diameter than the gland bore 96. The inner diameter of the nut receiving bore 98 is greater than the outer diameter of the nut 50, leaving an annulus 126 therebetween when the housing 90 slides over the nut 50. The nut receiving bore 98 is also sufficiently long for the full length of the nut 50 to be received fully within the housing 90 so that the exterior end face of the nut head 52 aligns with the housing head 120. The nut 50, therefore, can be tightened to contact the mounting plate 12, and the housing 90 can slide over the nut 50 until the housing head 120 also contacts the mounting plate 12. Inside the housing 90, a gland shoulder 122 is formed where the gland bore 96 meets the smaller-diameter nut receiving bore 98. When both the nut head 52 and the housing head 120 abut the mounting plate 12, the second groove wall 58 aligns with the gland shoulder 122, together providing sufficient surface to support the first O-ring 40.

At the other end of the nut receiving bore 98 from the gland bore 96 is a nut landing shoulder 100 facing toward the housing head 120 and contacting the nut base 78. The nut landing shoulder 100 is formed where the nut receiving bore 98 opens into a smaller-diameter cylinder passage bore 102. The other end of the cylinder passage bore 102 connects to a larger-diameter cylinder head bore 104, thereby forming a head landing shoulder 106 that faces toward the housing base 110. The cylinder head bore 104 connects in turn to a cap bore 112 that opens to the exterior of the housing 90 through the housing base 110. A snap ring bore 108 is located intermediate the ends of the cylinder head bore 104, closer to the end joining the cap bore 112. The snap ring bore 108 is cut into the interior walls of the housing 90, and has a larger diameter than the cylinder head bore 104. A pair of notches 118 are cut into the body of the housing 90 to join the nut receiving bore 98 and the cylinder head bore 104, each notch 118 matching the width and depth of the longitudinal grooves 76. Thus, when the nut 50 and housing 90 are assembled as shown in FIG. 3, and the longitudinal grooves 76 are aligned with the notches 118 as shown in FIG. 2, there results a bore with a constant outer diameter extending from the cylinder head bore 104 to the anchor receiving bore 70, but only to the extent of the arc length of the longitudinal grooves 76 and the notches 118. Cap receiving threads 114 are cut along the periphery of the cap bore 112, connecting the interior of the cap bore 112 with the opening in the housing base 110. A beveled sealing shoulder 116 links the cap receiving threads 114 with the exterior of the housing base 110.

Figure 5:
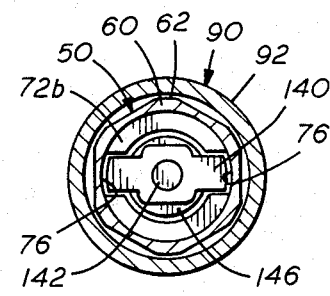
FIG. 5 illustrates a cross-sectional view of the fastener of FIG. 4, viewed along lines 5—5.

With reference now to FIGS. 4 and 5, the housing 90 is shown therein being installed over the nut 50. With additional reference to FIG. 1, the lock cylinder 130 includes a cylinder body 132 having a flat cylinder base 146 at one end, and attached at the other end to a larger-diameter, disc-shaped cylinder head 134. The cylinder head 134 has a head base 136 on the side joining the cylinder body 132, and a key slot 144 on the other side. When the key 170 is not inserted into the key slot 144, springs (not shown) inside the cylinder body 132 propel an array of locking dogs 138 from the cylinder body 132, in a direction perpendicular to the cylindrical axis of the cylinder body 132. As illustrated further in FIG. 5, a lug mounting pin 142 concentrically aligned with the axis of the cylinder body 132 secures a rectangular box-shaped anchor lug 140 to the cylinder base 146. Alternatively, the lug mounting pin 142 can be made integrally with the cylinder body 132. The lug mounting pin 142 prevents rotation of the anchor lug 140 relative to the cylinder body 132. The long axis of the anchor lug 140 is oriented perpendicularly to the axis of the cylinder body 132, and also perpendicular to the axis of projection of the locking dogs 138 from the cylinder body 132. The long axis of the anchor lug 140 is thus perpendicular to the plane defined by the axis of the cylinder body 132 and the axis of projection of the locking dogs 138.

Referring to FIGS. 1, 3, 4, and 5, the lock cylinder 130 is inserted into the housing 90 through the housing base 110 opening until the cylinder head base 136 contacts and seats against the head landing shoulder 106. Before the lock cylinder 130 can be inserted through the housing base 110, two conditions must exist. First, the anchor lug 140 must be aligned to pass through the notches 118. Due to symmetry, and there being a pair of notches 118, the lock cylinder 130 can be inserted into the housing 90 in either of two orientations, each 180° apart. Next, the key 170 must be fully inserted through the key slot 144 and into the lock cylinder 130. With the key 170 fully inserted and seated in the lock cylinder 130, the locking dogs 138 are retracted inside the cylinder body 132 sufficiently to allow the lock cylinder 130 to enter the cylinder passage bore 102 of the housing 90. The lock cylinder 130 thus can be inserted until the cylinder head base 136 finally seats against the head landing shoulder 106. Once the cylinder head 134 clears the snap ring bore 108, the key 170 can be removed, and the snap ring 160 can be installed within the snap ring bore 108 to hold the lock cylinder 130 inside the housing 90. The snap ring has a ring body 162 generally circular in shape and having an outer diameter substantially equal to or slightly greater than the inner diameter of the snap ring bore 108. The circle defined by the ring body 162 is not complete, having a gap where a pair of snap ring eyes 164 join opposite ends of the ring body 162. Each snap ring eye 164 has an eye hole 166 to facilitate grasping the snap ring eyes 164 for installing the snap ring 160. When force is applied to draw the eye holes 166 together, the outer diameter of the ring body 162 becomes small enough to pass into and through the cylinder head bore 104. The snap ring 160 is then positioned concentrically with the axis of the housing 90 and aligned with the snap ring bore 108. Upon releasing the force holding the eye holes 166 together, the ring body 162 expands to fit inside the snap ring bore 108. The inner diameter of the snap ring 160 is smaller than the outer diameter of the cylinder head 134. The cylinder head 134 is thus restrained between the head landing shoulder 106 and the snap ring 160, but the lock cylinder 130 is otherwise free to rotate about the axis of the housing 90.

Prior to installing the housing 90 and the attached lock cylinder 132 onto the nut 50, the first O-ring 40 is landed within the circumferential groove 54 on the exterior of the nut 50. Lubricant is applied as desired to ensure the first O-ring 40 will effect a seal between and with both the exterior of the nut 50 and the gland bore 96 inside the housing 90. To slide the housing 90 over the nut 50, as shown in FIG. 4, the anchor lug 140 must align with the longitudinal grooves 76 of the nut 50, just as the anchor lug 140 had to align with the notches 118 for installation inside the housing 90. As can be seen further in FIG. 5, as the housing 90 slides over the nut 50 the anchor lug 140 travels the length of the longitudinal grooves 76. As long as the anchor lug 140 rides inside the longitudinal grooves 76, the lock cylinder 130 cannot be rotated about its axis relative to the nut 50. With continued travel of the housing 90 and the attached lock cylinder 130 over the nut 50, the lowermost of the locking dogs 138 contacts the entry shoulder 82 of the nut 50. The sloping surface of the entry shoulder 82 allows the contacting locking dog 138 to be pushed within the cylinder body 132 upon further travel of the lock cylinder 130. Similarly, the remaining locking dogs 138 become successively retracted as the housing 90 and lock cylinder 130 assembly is installed over the nut 50. The sloping entry shoulder 82 thus permits insertion of the lock cylinder 130 within the nut 50 without the need for the key 170 to retract the locking dogs 138. When the housing head 120 finally seats against the mounting plate 12, the gland shoulder 122 aligns with the second groove wall 58, as noted previously. The edge of the anchor lug 140 adjacent to the cylinder base 146 also then exits the longitudinal grooves 76 and enters the anchoring bore 70. With the anchor lug 140 having cleared the anchoring shoulder 72b, the anchor lug 140 is no longer constrained by the walls of the longitudinal grooves 76. The lock cylinder 130 is now free to rotate within the nut 50. Rotating the lock cylinder 130 through 90° will align the locking dogs 138 with one of the longitudinal grooves 76 of the nut 50. The width of the locking dogs 138 is smaller than the corresponding width of each longitudinal groove 76 (the "width" of the longitudinal grooves 76 being determined by the arc length of the longitudinal grooves 76). The locking dogs 138, no longer restrained by the inner diameter of the cylinder receiving bore 74, now spring outward into the aligned longitudinal groove 76.

Figure 6:
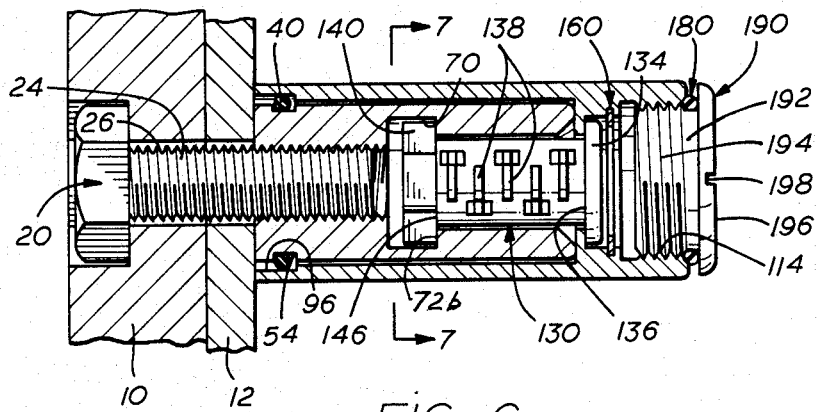
FIG. 6 illustrates an elevational sectional view of the fastener of FIG. 1, after installation is complete.
Figure 7:
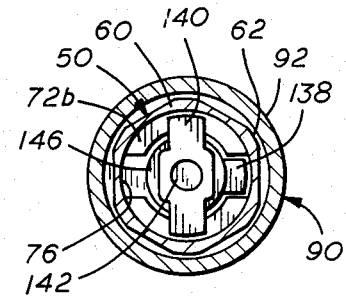
FIG. 7 illustrates a cross-sectional view of the fastener of FIG. 6, viewed along lines 7—7.

FIGS. 6 and 7 together show the final position of the fastener after rotation of the lock cylinder 130 and seating of the locking dogs 138 within one of the longitudinal grooves 76. The locking dogs 138 project into the aligned longitudinal groove 76, thereby preventing the lock cylinder 130 from rotating within the nut 50. The anchor lug 140 seats against the anchoring shoulder 72b, preventing removal of the lock cylinder 130 from the nut 50.

The fastener is now secured. With the housing 90 in place, a wrench or other torque-inducing instrument cannot directly contact the nut 50. The exterior surface 62 of the nut 50 is surrounded by the housing 90. The housing head 120, moreover, abuts the mounting plate 12 to cover even the nut head 52. The housing 90 thereby surrounds the entirety of the nut 50, precluding unauthorized access to the nut 50. The housing 90 is also locked to the nut 50 by the lock cylinder 130, in the following manner: the anchoring shoulder 72b retains the anchor lug 140 inside the anchoring bore 70, thereby securing the lock cylinder 130 to the nut 50; the locking dogs 138 protrude into one of the longitudinal grooves 76, preventing rotation of the lock cylinder 130 and thereby keeping the anchor lug 140 trapped in the anchoring bore 70; and, finally, the cylinder head base 136 obstructs access to the head landing shoulder 106 to prevent removal of the housing 90. The housing 90 is thus securely attached to the lock cylinder 130, which, in turn, is locked to the nut 50. The housing 90, nevertheless, is free to rotate while leaving the nut 50 fully seated against the mounting plate 12. There is no means for transmitting any substantial torque from the housing 90 to the nut 50 or the lock cylinder 130. As can be seen in FIGS. 3 and 4, the outer diameter of the cylinder body 132 is smaller than the diameter of the cylinder passage bore 102 within the housing 90. Hence, rotating the housing 90 will not rotate the lock cylinder 130, due to the annular clearance between the bore 102 and the cylinder 132. Further, the annulus 126 allows the housing 90 to rotate around the nut 50. Lastly, although both the nut 50 and the housing 90 engage the first O-ring 40, the first O-ring 40 is incapable of transmitting torque sufficient to turn the nut against the seating force exerted by the tightened, threaded connection of the bolt 20 and the nut 50. If the set screw 64 is seated against the bolt shaft 24, then it is essentially impossible for any torque that could be applied to the nut 50 to be sufficient to dislodge and turn the nut 50. Subsequent authorized removal, however, is quite simple. Inserting the key 170 into the key slot 144 again retracts the locking dogs 138. The locking cylinder 130 is thus free to rotate. Rotating the locking cylinder 130 through 90° again aligns the anchor lug 140 and the longitudinal grooves 76. Reversing the installation process, the housing 90 and lock cylinder 132 can then slide off the fastener to expose the nut 50, for further disassembly.

Installing the cap 190 will complete assembly of the sealed fastener, according to the present invention. The cap 190, as shown in FIGS. 1, 3, and 6, includes cap threads 194 for threadingly engaging the cap receiving threads 144 of the housing 90. The cap 190 also has a cap head 196 with a drive slot 198 and an outer diameter larger than the opening of the sealing shoulder 116. Between the cap threads 194 and the cap head 196 is a circumferential groove 192 sized to accept the second O-ring 180. The cap 190 is threaded into the cap receiving threads 114, and tightened into the housing 90. For proper sealing, it is usually desirable to lubricate the second O-ring 180 and/or the sealing shoulder 116 prior to seating the cap 190. To ensure a tight seal, a screwdriver or the like can be used to apply torque to the drive slot 198 to completely seat the cap 190. As the cap 190 rotates to a fully seated position, the base of the cap head 196 presses the second O-ring 180 into tight sealing engagement with the cap head 196 and the sealing shoulder 116. Installation of the fully sealed fastener, according to the present invention, is then complete.

The invention, therefore, solves difficulties and problems inherent in the prior art secured fasteners. With the first and second O-rings 40, 180 and the cap 190 installed, the space enclosed by the housing 90 is kept free of environmental contamination and is protected against exposure to the elements. The O-rings 40, 180 maintain a leak-tight seal, excluding water and other corrosive agents that would degrade and destroy the integrity and operation of the nut 50 and the mechanisms of the lock cylinder 130. The sealed fastener made in accordance with the present invention thus enjoys a considerably longer life, with reduced operational difficulties, than prior art secured fasteners. Moreover, while the O-rings 40, 180 serve to seal the enclosed space within the housing 90, the housing 90 and the cap 190 cover and shield the first and second O-rings 40, 180, respectively, from accidental or environmental damage and loss. The invention, therefore, achieves the goal of providing removable fasteners, secured against unauthorized removal, yet protected against the elements, thereby enjoying longer effective lives and increased economic value.

Further modifications to the fastener shown and described above, yet remaining within the spirit of the invention, could include any form of removable fastener other than a standard nut and bolt assembly. Further, the cap need not necessarily attach to the housing by threading thereto. A major purpose of the cap is to assist in sealing the housing interior. A cap, such as a friction-fit cap, without an O-ring or threads, would still be constructed in accordance with the present invention.

While a preferred embodiment has been shown and described, further modifications thereof can be made by one skilled in the art without departing from the spirit of the invention.

What is claimed is:

1. An apparatus for sealably securing a bolt, comprising:
    a nut member for mating with and securing the bolt,
    said nut member having a nut body with an exterior surface of the same general shape from the nut head at one end to the nut base at the other end, said nut body having a circumferential groove adjacent said nut head adapted for an O-ring,
    said nut body having a threaded bore extending from said nut head to an anchoring bore, and a receiving bore and a pair of longitudinal grooves cut into the interior wall of said nut body extending from said anchoring bore to said nut base providing a securing end and a locking end of said nut member;
    a housing with an exterior surface which extends from the housing head to the housing base for substantially surrounding said nut member,
    said housing having a nut receiving bore which has an inner diameter greater than the outer diameter of said nut member and extends to an inwardly projecting nut landing shoulder, such that when said shoulder contacts said nut base both said nut head and said housing head are flush with an adjacent surface, and gland bore which extends from said housing head to said nut receiving bore;
    locking means, disposed within said housing, for locking said housing to said nut member wherein said housing can move without imparting sufficient torque to said nut member to rotate said nut member; and
    sealing means for sealing said nut member within said housing.

2. The apparatus of claim 1 wherein said sealing means includes a first elastomeric O-ring.

3. The apparatus of claim 1 wherein said sealing means includes a cap for sealing an opening in said housing base.

4. The apparatus of claim 1 wherein said nut member has a hexagonal exterior surface.

5. The apparatus of claim 1 which further includes a set screw extending through said nut body for engaging the threads of said bolt.

6. An apparatus for sealably securing a bolt, comprising:
    a nut member for mating with and securing the bolt,
    said nut member having a nut body with an exterior surface of the same general shape from the nut head at one end to the nut base at the other end, said nut body having a circumferential groove adjacent said nut head adapted for an O-ring,
    said nut body having a threaded bore extending from said nut head to an anchoring bore, and a receiving bore and a pair of longitudinal grooves cut into the interior wall of said nut body extending from said anchoring bore to said nut base providing a securing end and a locking end of said nut member;
    a housing with an exterior surface which extends from the housing head to the housing base for substantially surrounding said nut member,
    said housing having a nut receiving bore which has an inner diameter greater than the outer diameter of said nut member and extends to an inwardly projecting nut landing shoulder such that when said shoulder contacts said nut base both said nut head and said housing head are flush with an adjacent surface, and a gland bore which extends from said housing head to said nut receiving bore;
    locking means, disposed within said housing,
    said locking means including a lock cylinder having an anchor lug adapted for locking said housing to a flat anchoring shoulder in said nut member; and
    sealing means for sealing said nut member within said housing.

7. The apparatus of claim 6 wherein said sealing means includes a first elastomeric O-ring.

8. The apparatus of claim 6 wherein said sealing means includes a cap for sealing an opening in said housing base.

9. The apparatus of claim 6 wherein said nut member has a hexagonal exterior surface.

10. The apparatus of claim 6 which further includes a set screw extending through said nut body for engaging the threads of said bolt.

* * * * *